(12) United States Patent
Prevrhal et al.

(10) Patent No.: US 9,761,020 B2
(45) Date of Patent: Sep. 12, 2017

(54) LIST MODE DYNAMIC IMAGE RECONSTRUCTION

(75) Inventors: Sven Prevrhal, Hamburg (DE); Joerg Bredno, San Francisco, CA (US); Amy Perkins, Philadelphia, PA (US); Patrick Olivier, Solon, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 462 days.

(21) Appl. No.: 14/116,358

(22) PCT Filed: May 8, 2012

(86) PCT No.: PCT/IB2012/052273
§ 371 (c)(1),
(2), (4) Date: Nov. 8, 2013

(87) PCT Pub. No.: WO2012/153262
PCT Pub. Date: Nov. 15, 2012

(65) Prior Publication Data
US 2014/0119611 A1      May 1, 2014

Related U.S. Application Data

(60) Provisional application No. 61/485,135, filed on May 12, 2011.

(51) Int. Cl.
  *G06K 9/00* (2006.01)
  *G06T 11/00* (2006.01)
  *G06T 7/20* (2017.01)
(52) U.S. Cl.
  CPC .............. *G06T 11/005* (2013.01); *G06T 7/20* (2013.01); *G06T 11/006* (2013.01); *G06T 2211/412* (2013.01)

(58) Field of Classification Search
None
See application file for complete search history.

(56) References Cited

U.S. PATENT DOCUMENTS

| 7,599,540 B2 | 10/2009 | Koehler | |
|---|---|---|---|
| 2004/0138557 A1* | 7/2004 | Le et al. | 600/428 |

(Continued)

FOREIGN PATENT DOCUMENTS

| WO | 2007100955 A2 | 9/2007 |
|---|---|---|
| WO | 2009144607 A2 | 12/2009 |

OTHER PUBLICATIONS

Groiselle et al (3D PET List—Mode Iterative Reconstruction Using Time-Of-Flight Information, IEEE 2004).*

(Continued)

*Primary Examiner* — Amara Abdi

(57) ABSTRACT

A nuclear imaging apparatus (8) acquires nuclear imaging data comprising events wherein each event records at least spatial localization information and a timestamp for a nuclear decay event. An event-preserving image reconstruction module (22) reconstructs the nuclear imaging data using an event-preserving reconstruction algorithm to generate an image represented as an event-preserving reconstructed image dataset ($I_D$) comprising for each event the timestamp and at least one spatial voxel assignment. One or more structures are identified in the image and independent motion compensation is performed for each structure. In one approach, an events group is identified corresponding to the structure comprising events assigned to the structure by the event-preserving reconstructed image dataset; a time binning of the events of each events group is optimized based on a motion profile for the structure; time bin images are generated; and the structure is spatially registered in the time bin images.

26 Claims, 10 Drawing Sheets

(56) References Cited

U.S. PATENT DOCUMENTS

Figure 1:
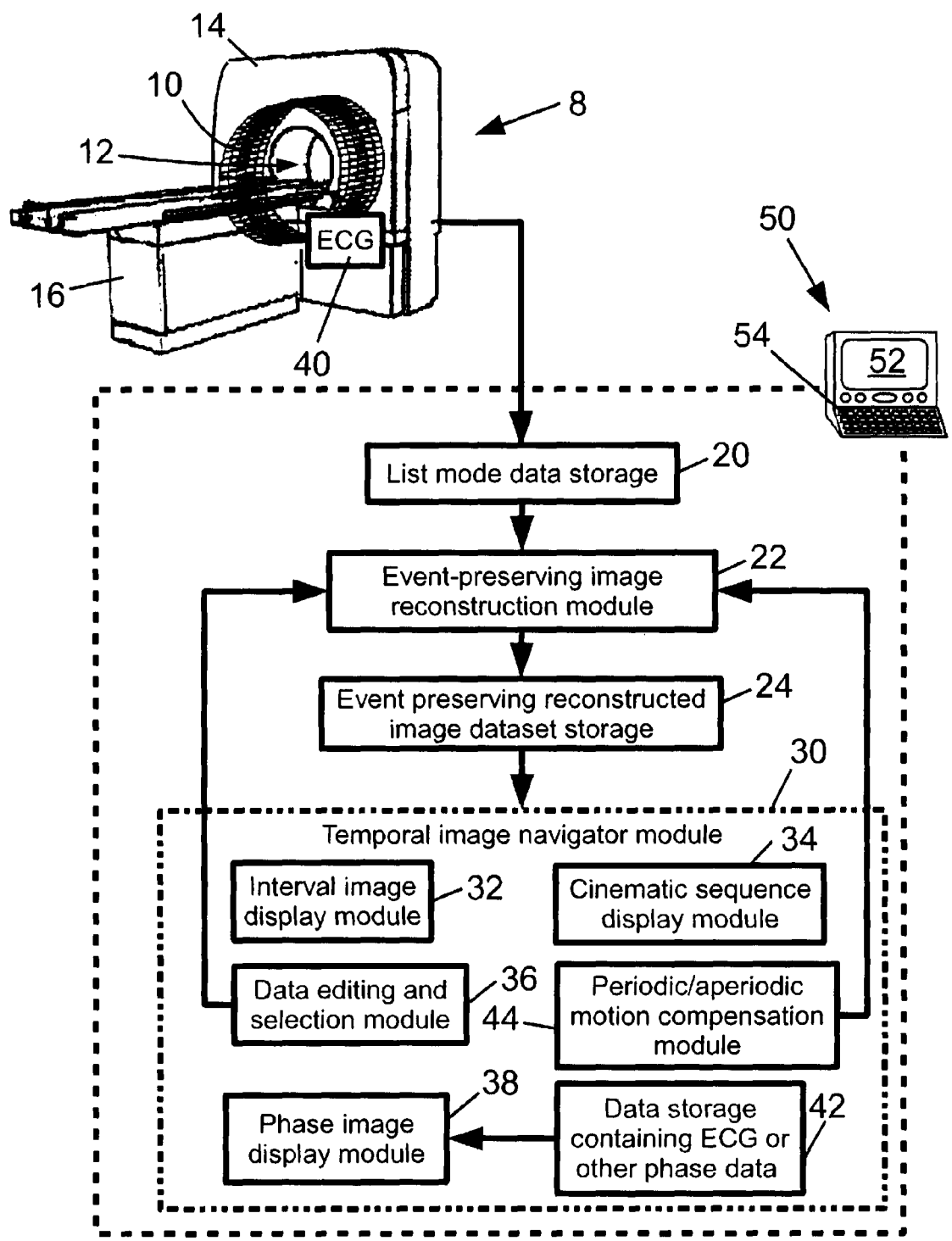

| | | | |
|---|---|---|---|
| 2008/0130838 A1* | 6/2008 | Muehllehner et al. | 378/207 |
| 2008/0273780 A1* | 11/2008 | Kohlmyer et al. | 382/131 |
| 2009/0324042 A1 | 12/2009 | Laurence et al. | |
| 2010/0030572 A1* | 2/2010 | Von Berg et al. | 705/2 |
| 2010/0067765 A1 | 3/2010 | Buther et al. | |
| 2010/0166274 A1 | 7/2010 | Busch et al. | |
| 2010/0202664 A1* | 8/2010 | Busch et al. | 382/107 |
| 2010/0290683 A1* | 11/2010 | Demeester et al. | 382/131 |

OTHER PUBLICATIONS

Bengel, F. M., et al.; Cardiac Positron Emission Tomography; 2009; J. American College of Cardiology; 54(1)1-15.

Conti, M., et al.; Time Resolution for Scattered and Unscattered Coincidences in a TOF PET Scanner; 2010; IEEE Trans. on Nuclear Science; 57(5)2538-2544.

Daube-Witherspoon, M. E., et al.; Comparison of List-Mode and Direct Approaches for Time-of-Flight PET Reconstruction; 2010; IEEE Trans. on Nuclear Science; pp. 2252-2258.

Espana, S., et al.; Improved image reconstruction in small animal PET using a priori estimates of single-pixel events; 2007; IEEE Trans. on Nuclear Science; pp. 3876-3880.

Giangrandi, S., et al.; Low-energy heavy-ion TOF-ERDA setup for quantitative depth profiling of thin films; 2008; Nuclear Instruments and Methods in Physics Research; B266:5144-5150.

Groiselle, C. J., et al.; 3D PET List-Mode Iterative Reconstruction Using Time-of-Flight Information; 2004; IEEE Trans. on Nuclear Science; vol. 4:2633-2638.

Mawlawi, O., et al.; Multimodality imaging: an update on PET/CT technology; 2009; Eur. J. Nucl. Med. Mol. Imaging; 36(Suppl. 1)S15-S29.

Sitek, A.; Reconstruction of Emission Tomography Data Using Origin Ensembles; 2011; IEEE Trans. on Medical Imaging; 30(4)946-956.

Vandenberghe, S., et al.; Optimization of 3D TOF PET reconstruction using a limited number of 2D histoprojections; 2005; IEEE Trans. on Nuclear Science; vol. 3:1596-1600.

* cited by examiner

Interval image  Cinematic movie

Interval time: $t_o$

Multiphasic time segmentation

Cardiac phase segmentation (systole/diastole)

LIST MODE DYNAMIC IMAGE RECONSTRUCTION

CROSS REFERENCE TO RELATED APPLICATIONS

This application is a national filing of PCT application Serial No. PCT/IB2012/052273, filed May 8, 2012, published as WO 2012/153262 A1 on Nov. 15, 2012, which claims the benefit of U.S. provisional application Ser. No. 61/485,135 filed May 12, 2011, which is incorporated herein by reference.

The following relates to the nuclear imaging arts, positron emission tomography (PET) imaging arts, single photon emission computed tomography (SPECT) imaging arts, image motion compensation arts, and related arts.

In nuclear imaging, radiation detectors disposed around a subject detect nuclear decay events. Each event is localized to a line of response (LOR) in the case of positron emission tomography (PET) or a projection line or small-angle cone (generally referred to herein as a "projection") in the case of single photon emission computed tomography (SPECT). In the case of PET imaging with time-of-flight (TOF) capability, the small time differential between the detections of the two oppositely directed 511 keV gamma rays is used to further localize the electron-positron annihilation event along the LOR. Typically, this localization is represented by a Gaussian or other statistical distribution "along" the LOR with the Gaussian peak at the most likely location of the electron-positron annihilation event and the Gaussian width (e.g., variance or standard deviation) indicative of uncertainty in the TOF localization.

A difficulty with nuclear imaging is that the rate of data acquisition is usually low. For example, in medical imaging applications a radiopharmaceutical is administered to a human subject (e.g., patient), and the nuclear imaging detects nuclear decay events (or more specifically electron-positron annihilation events in the case of PET) produced by the administered radiopharmaceutical. Patient safety dictates that the administered radiopharmaceutical dosage should be low so as to minimize radiation exposure of the patient—this translates into a low rate of decay events. As a consequence, nuclear imaging data acquisition typically takes place over a period of minutes, or tens of minutes, or longer. It is difficult or impossible for a patent to stay still over this extended period of time. Moreover, motion can be introduced by dynamically moving organs such as a beating heart or thoracic region movements associated with patient breathing. In the case of functional imaging the distribution of radiopharmaceutical may also vary over time in accordance with patient metabolism or other functional activity.

In such cases, the nuclear imaging data acquired over the extended acquisition time exhibits motion-related artifacts (where "motion" is to be broadly construed as encompassing movement of the radiopharmaceutical caused by functional activity in the patient as well as anatomical motion in the form of cardiac or respiratory voluntary or involuntary cycling or patient movement. Motion-related artifacts in the acquired nuclear imaging data usually manifest as blurring in the reconstructed image.

Various approaches are known for reducing motion-related artifacts in nuclear imaging. One approach is to proactively minimize the motion, for example through the use of patient restraints. Such proactive approaches are less effective as the imaging data acquisition time length increases, and are generally ineffective for suppressing autonomous motion such as cardiac or respiratory cycling that occurs over a time frame that is much shorter than the imaging data acquisition time.

In the case of cardiac cycling, respiratory cycling, or other cyclical motion, gating may be employed. In this approach, the cyclical motion is monitored during imaging data acquisition, for example using an electrocardiograph in the case of cardiac cycling. The nuclear imaging data are then sorted by phase, and the data sorted into each phase are reconstructed together to generate different images corresponding to different phases of the cyclical motion. A problem with this approach is that each "phase sub-set" of the imaging data includes only a small subset of the total acquired nuclear imaging dataset. As a result, the "phase" images are sometimes noisy due to the limited data available for reconstruction. A tradeoff is made between image blurriness caused by low phase resolution (if the number of phases "bins" is small), on the one hand, or noise from data sparsity (if the number of phase bins is large) on the other hand.

Yet another approach is local motion compensation, some examples of which are described in Busch et al., U.S. Pub. No. 2010/0166274 A1 published Jul. 1, 2010. In an illustrative local motion compensation approach, the events are grouped into small intervals, e.g. 100 millisecond intervals, and each group is reconstructed to produce an image that is likely to be noisy but is also likely to have substantially suppressed motion artifacts. These images are used to characterize local motion in a region of interest, and the corresponding events are shifted in space to compensate for the local motion. The thusly corrected event data are then reconstructed to generate an image with local motion compensation.

The following provides new and improved apparatuses and methods as disclosed herein.

In accordance with one disclosed aspect, a method comprises: providing nuclear imaging data comprising events wherein each event records at least spatial localization information for a nuclear decay event and a timestamp for the nuclear decay event; reconstructing the nuclear imaging data using a digital processing device implementing an event-preserving reconstruction algorithm to generate an event-preserving reconstructed image dataset comprising for each event the timestamp and at least one spatial voxel assignment; identifying a plurality of structures of interest in the event preserving reconstructed image dataset; performing independent motion compensation for each identified structure of interest to generate motion compensated image data; and displaying the motion compensated image data in a visually perceptible format.

In accordance with one disclosed aspect, a method comprises: providing nuclear imaging data comprising events wherein each event records at least spatial localization information for a nuclear decay event and a timestamp for the nuclear decay event; reconstructing the nuclear imaging data using a digital processing device implementing an event-preserving reconstruction algorithm to generate an event-preserving reconstructed image dataset comprising for each event the timestamp and at least one spatial voxel assignment; identifying a structure of interest in the event preserving reconstructed image dataset; identifying an events group corresponding to the structure wherein the events group comprises events assigned to spatial voxels of the structure by the event preserving reconstructed image dataset; identifying a motion profile for the structure; optimizing time bins for time binning events of the events group based on the motion profile for the structure; and generating a time bin image for each optimized time bin.

In accordance with another disclosed aspect, a method includes: providing nuclear imaging data comprising events wherein each event records at least spatial localization information for a nuclear decay event and a timestamp for the nuclear decay event; reconstructing the nuclear imaging data to generate an image by using a digital processing device to perform an event preserving image reconstruction algorithm to generate an event preserving reconstructed image dataset comprising for each event the timestamp and at least one spatial voxel assignment; and storing the image comprising the event preserving reconstructed image dataset in a data an image dataset storage.

In accordance with another disclosed aspect, a storage medium stores instructions executable by a digital processor to perform a method comprising: receiving a set of events wherein each event records at least spatial localization information and a timestamp for a nuclear decay event occurring in a subject; reconstructing the set of events to generate an image comprising an event-preserving reconstructed image dataset, the reconstructing comprising assigning spatial voxels to events of the set of events; and performing a post-reconstruction image processing operation on the image, the post-reconstruction image processing operation utilizing timestamps of the event preserving reconstructed image dataset. In some embodiments the post-reconstruction image processing operation comprises performing motion compensation on the image that compensates for non-uniform motion based on timestamp information of the event preserving reconstructed image dataset. In some embodiments the post-reconstruction image processing operation comprises: identifying a structure in the image; identifying an events group corresponding to the structure wherein the events group comprises events assigned to spatial voxels of the structure by the event-preserving reconstructed image dataset; optimizing time binning of the events of the events group based on a motion profile characterizing motion of the structure; generating time bin images for the time bins; and spatially registering the structure in the time bin images to generate a motion corrected structure image.

One advantage resides in providing an event-preserving reconstructed image dataset reconstructed from nuclear imaging data.

Another advantage resides in providing nuclear images with reduced motion artifacts due to optimized time segmentation.

Another advantage resides in flexible post-reconstruction image processing including time segmentation flexibility for generating time interval images, phase-segmented images, cinematic sequences of selectable time resolution, and so forth.

Another advantage resides in facilitating removal of time intervals of "bad" imaging data.

Another advantage resides in providing the ability to identify and correct both periodic and aperiodic motion.

Another advantage resides in providing the ability to correct motion of different structures having different motion trajectories in the same image.

Further advantages will be apparent to those of ordinary skill in the art upon reading and understanding the following detailed description.

FIG. 1 diagrammatically shows a nuclear imaging system including event-preserving image reconstruction and post-reconstruction processing modules as disclosed herein.

Figure 2:
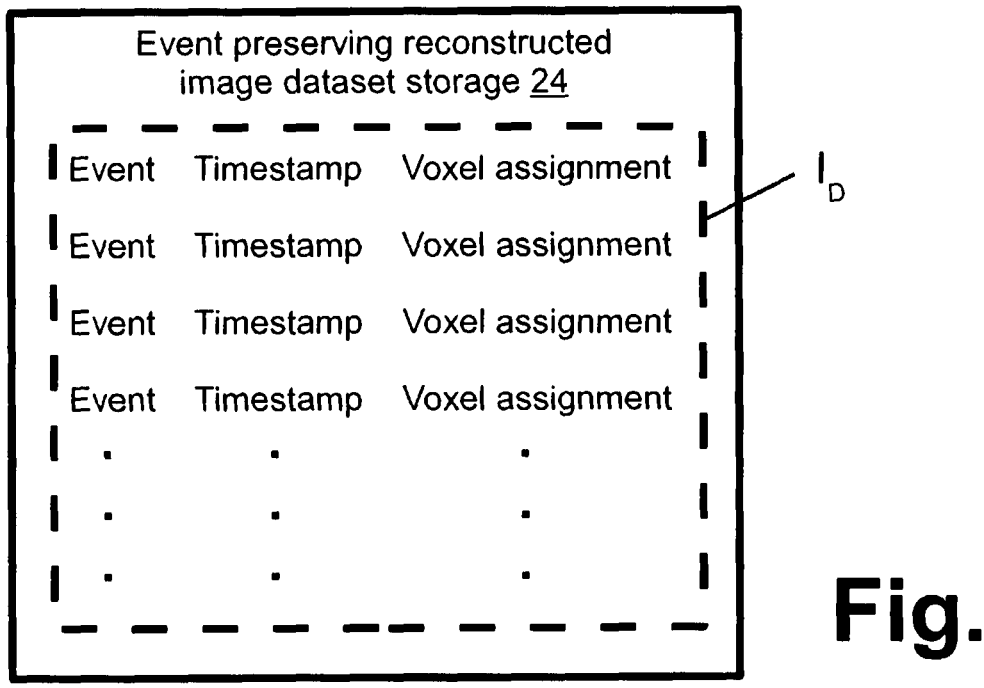
Figure 3:
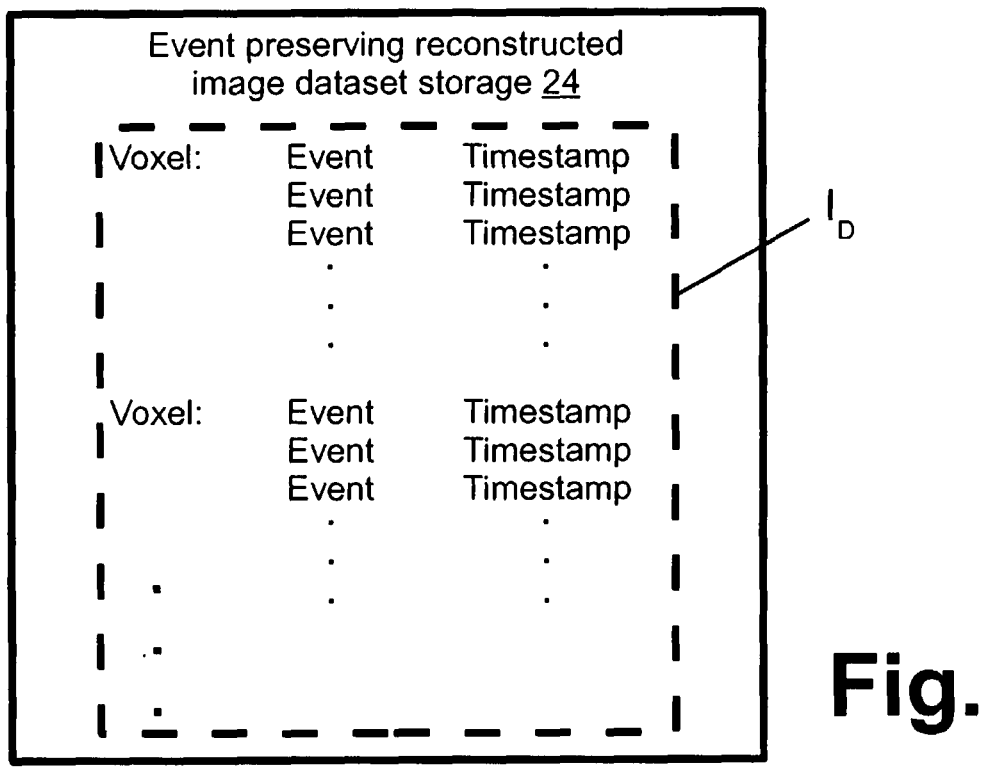

FIGS. 2 and 3 diagrammatically show two suitable formats for storing an event-preserving reconstructed image dataset.

Figure 4:
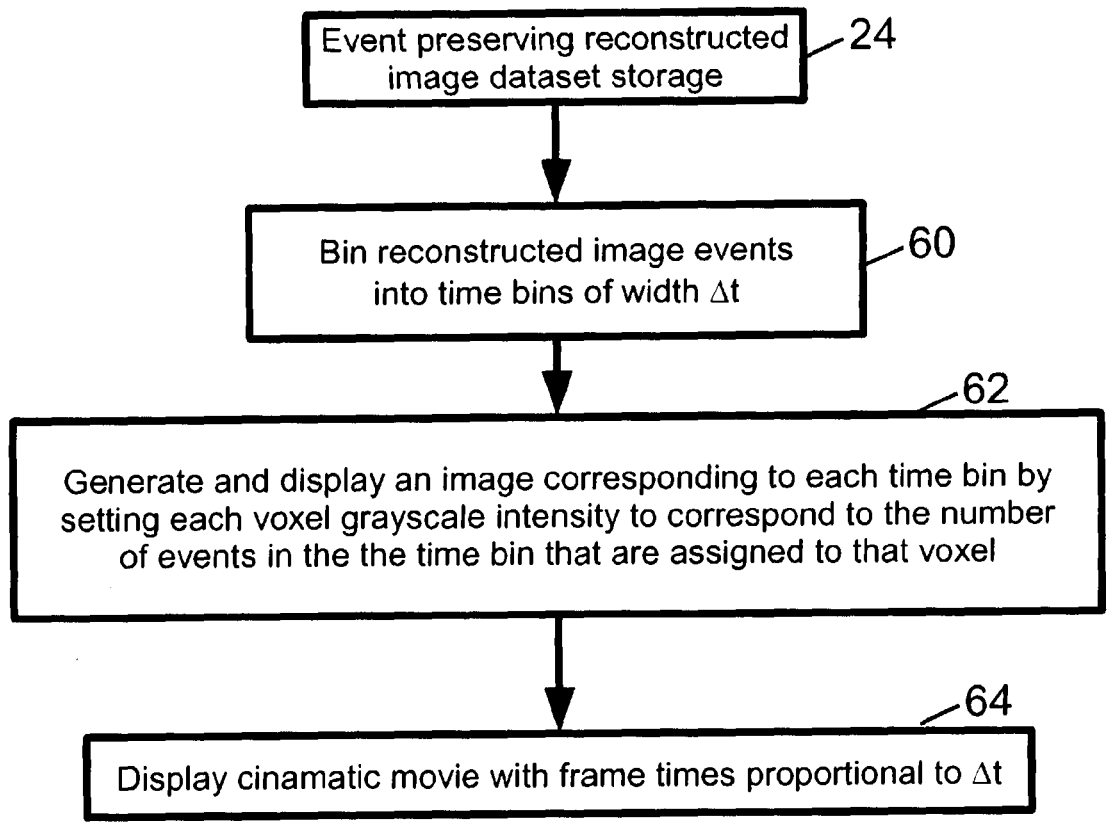

FIG. 4 diagrammatically shows suitable processing performed by the interval image and cinematic sequence display modules of FIG. 1.

Figure 5:
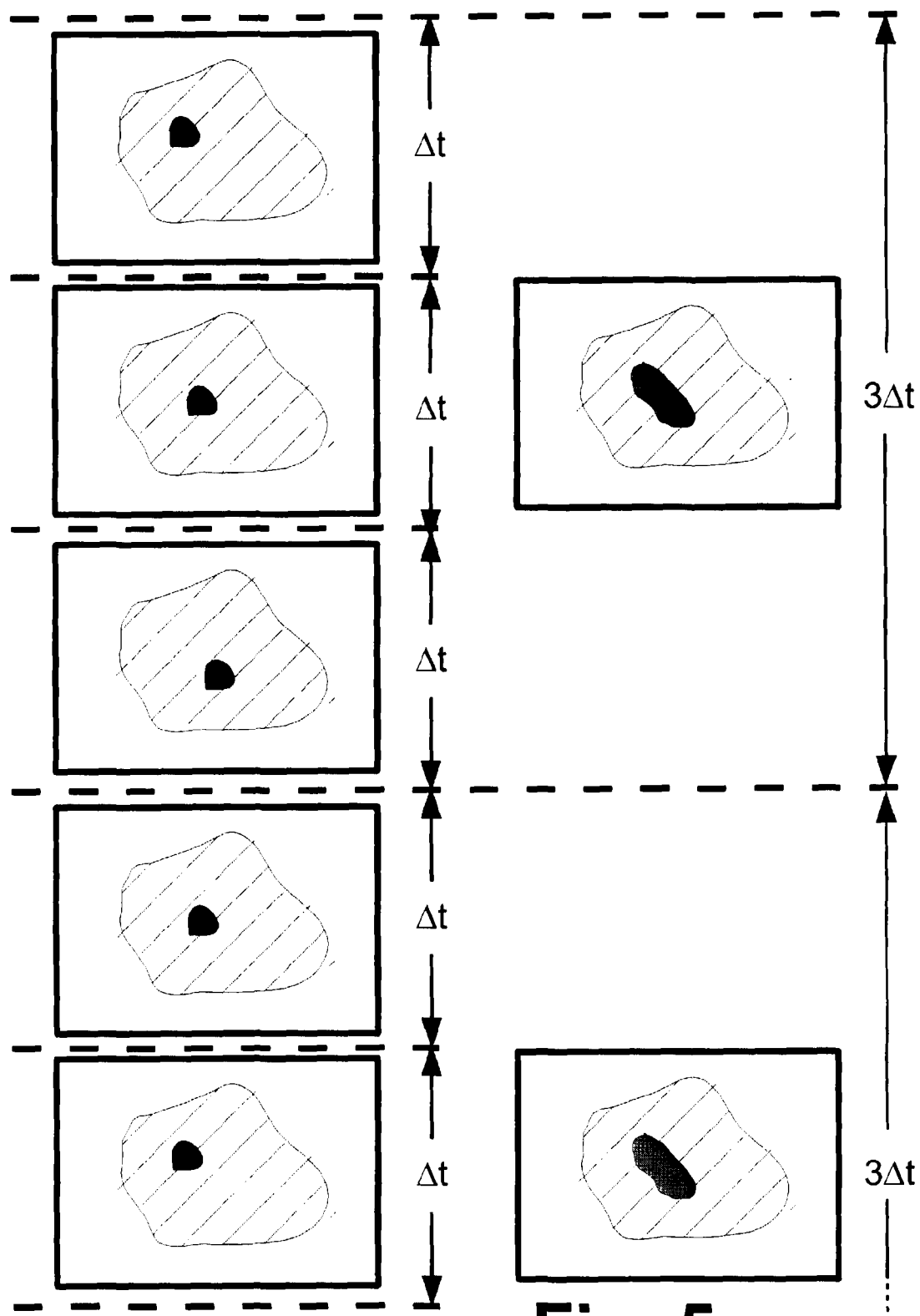

FIG. 5 diagrammatically shows a sequence of interval images for successive time intervals for different time interval widths: $\Delta t$ (lefthand side); and $3\Delta t$ (righthand side).

Figure 6:
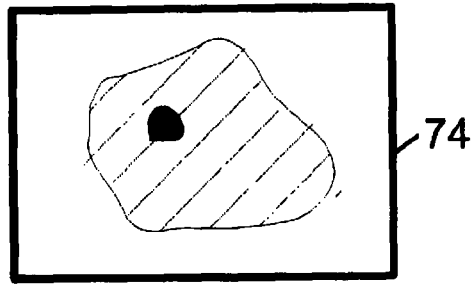
Figure 6:
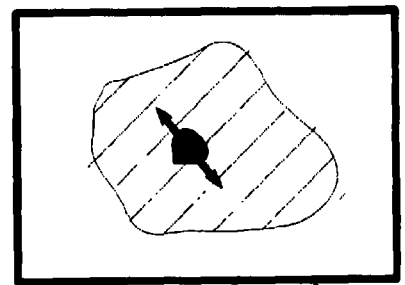
Figure 6:
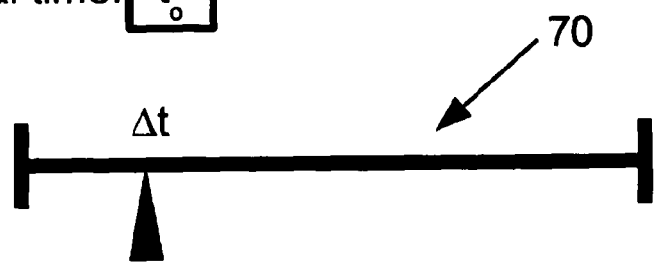
Figure 6:
Figure 6:
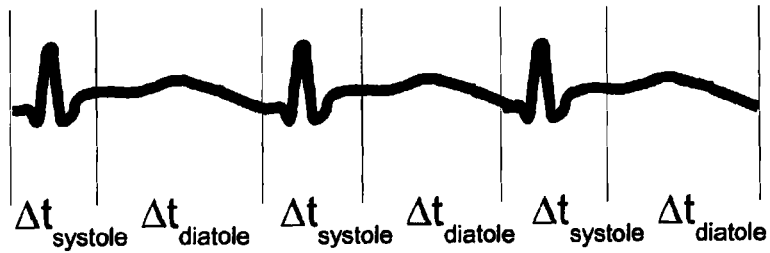

FIG. 6 diagrammatically shows a suitable display for showing the system of FIG. 1 including selected user input dialogs.

Figure 7:
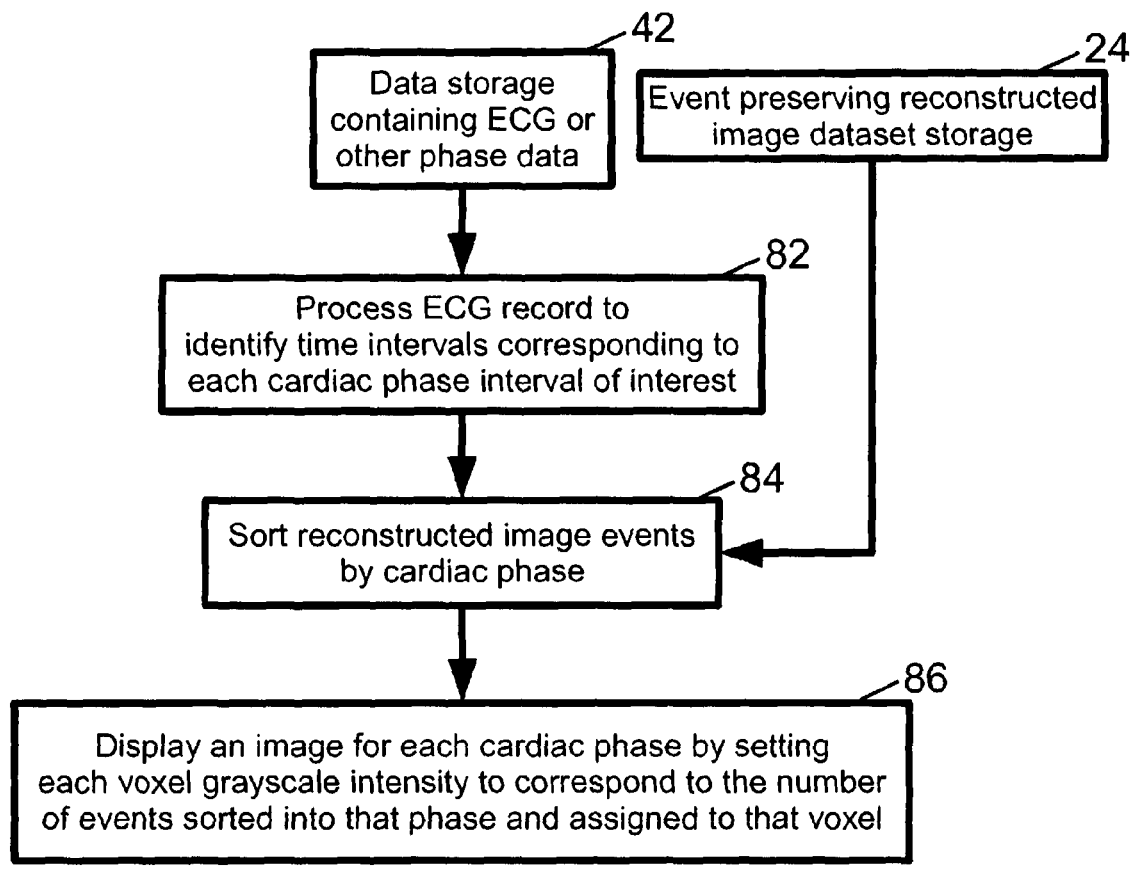

FIG. 7 diagrammatically shows suitable processing performed by the multiphasic image series module of FIG. 1.

Figure 8:
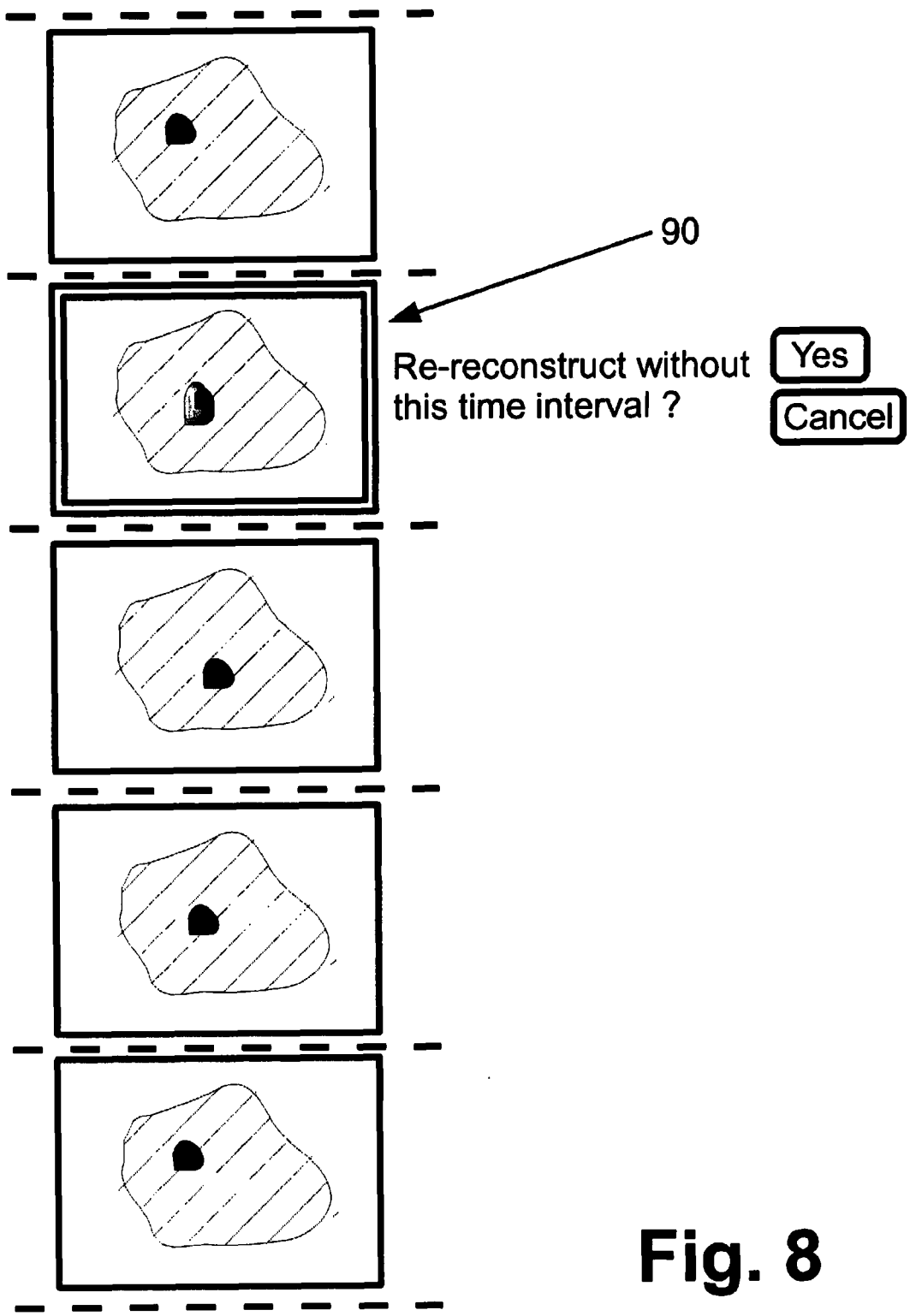
Figure 9:
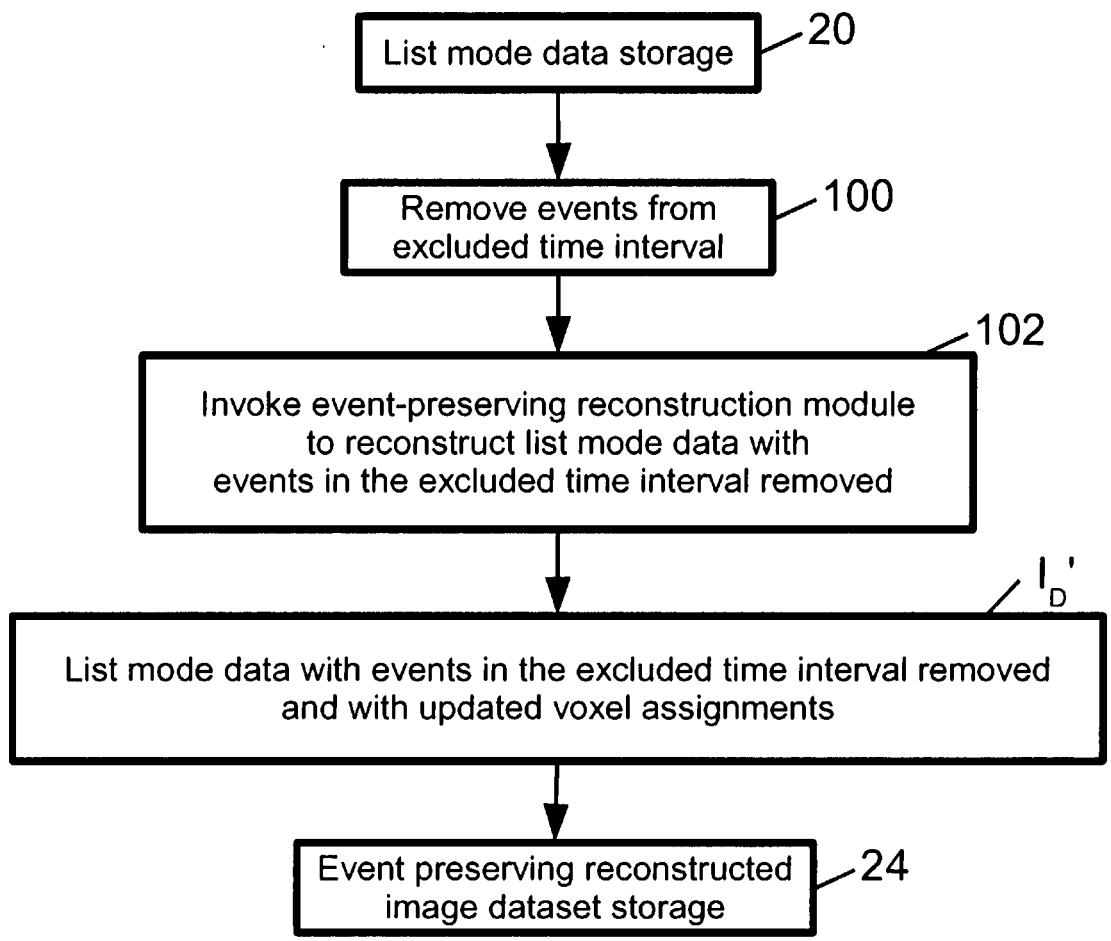
Figure 10:
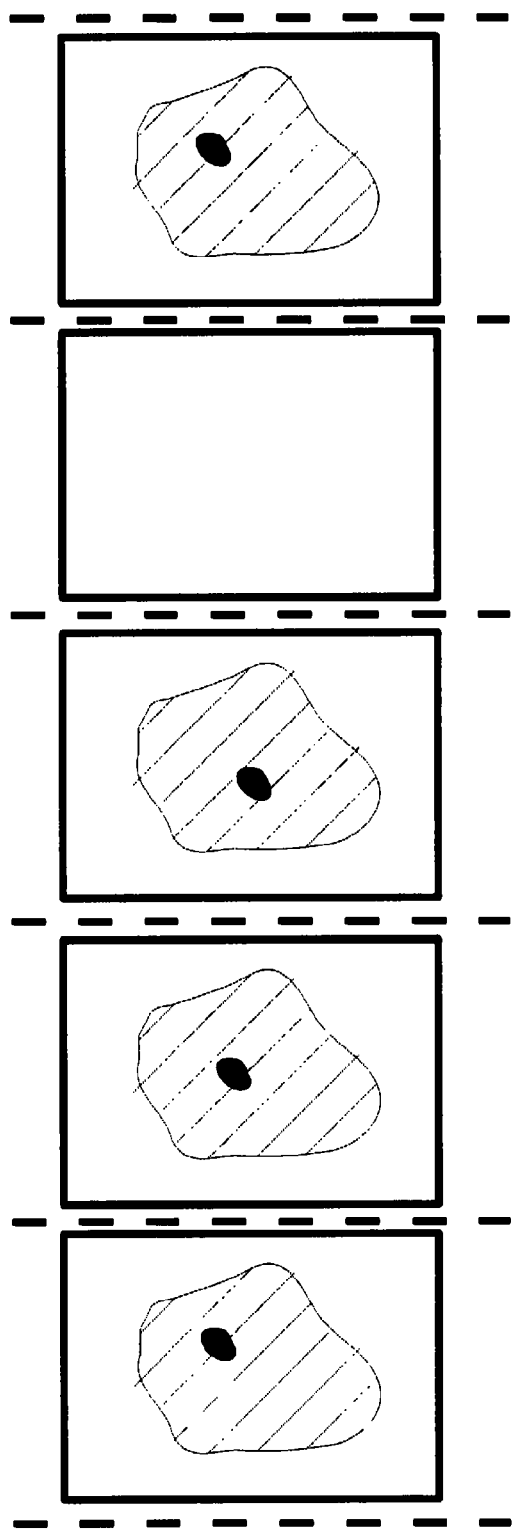

FIGS. 8-10 diagrammatically show suitable processing performed by the data editing and selection module of FIG. 1.

Figure 11:
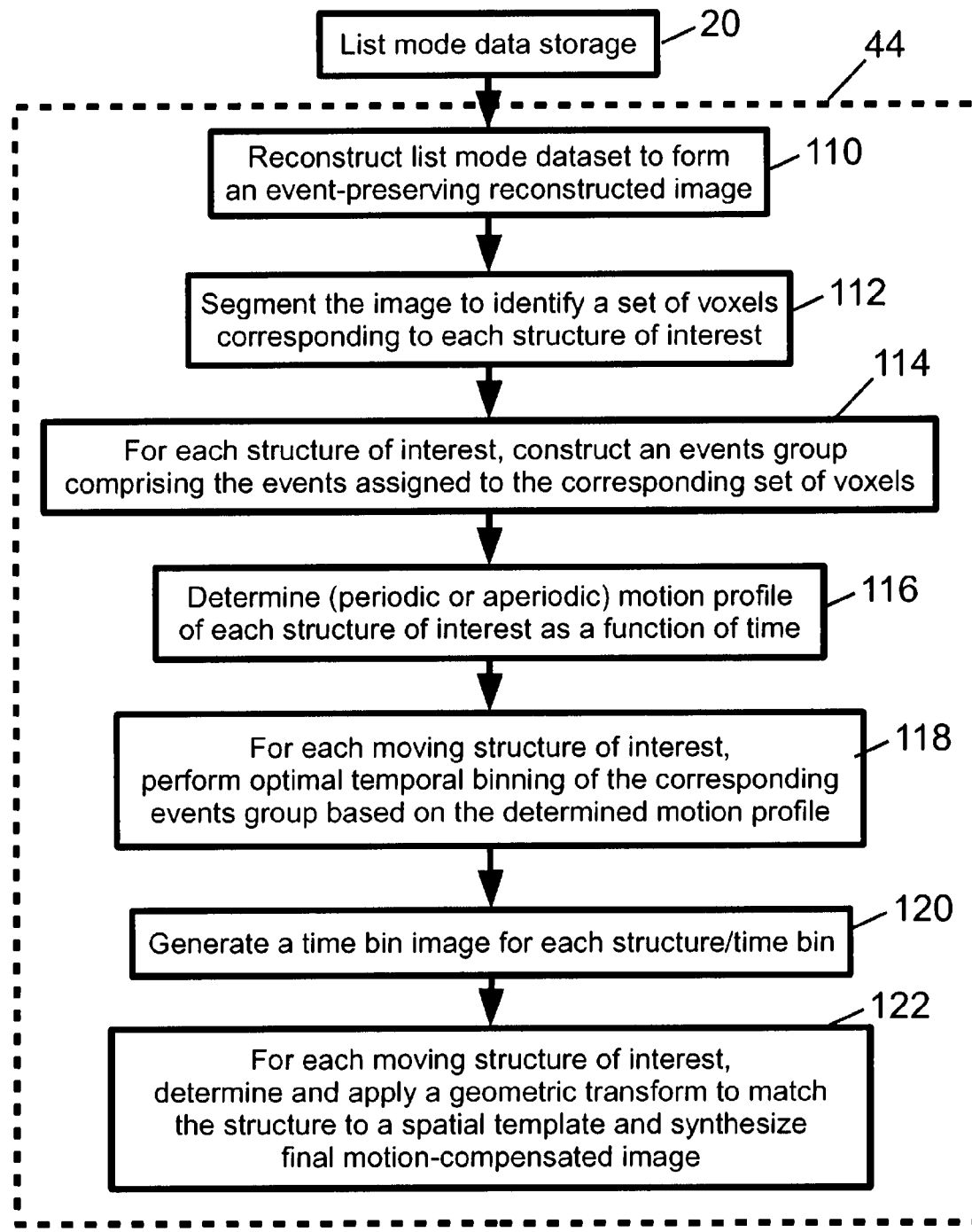

FIG. 11 diagrammatically shows suitable processing performed by the motion compensation module of FIG. 1.

With reference to FIG. 1, a positron emission tomography (PET) scanner 8 includes a plurality of radiation detectors 10 arranged to view an imaging region 12. In FIG. 1, the plurality of radiation detectors 10 are arranged in several rings of detectors along an axial direction; however, other arrangements of radiation detectors can be used. Moreover, it is to be appreciated that the plurality of radiation detectors 10 is diagrammatically illustrated; typically the radiation detectors are housed within a housing 14 of the scanner 8 and thus are not visible from the outside, and typically each ring of radiation detectors includes hundreds or thousands of radiation detectors. In some PET scanners, only a single ring of radiation detectors is provided, in others, two, three, four, five, or more rings of radiation detectors are provided. It should be appreciated that movable SPECT or PET detector heads can be used in place of the illustrative detector ring in order to achieve a 360° view of the subject. The PET scanner 8 includes a couch 16 or other support for positioning a human patient or other imaging subject in the imaging region 12. Optionally, the couch 16 is linearly movable in the axial direction generally transverse to the rings of radiation detectors 10 to facilitate acquisition of three-dimensional imaging data. Additionally or alternatively, the imaging subject can be held stationary, and the plurality of rings of radiation detectors used to acquire three-dimensional TOF-PET imaging data. In yet other embodiments, only a single ring of detectors is provided, the imaging subject remains stationary, and the resulting image is two-dimensional.

A suitable radiopharmaceutical is administered to the patient or other imaging subject prior to initiation of PET imaging. The radiopharmaceutical includes a radioactive substance that undergoes nuclear decay events that emit positrons. The positrons rapidly annihilate with nearby electrons of the imaging subject. The resulting positron-electron annihilation event produces two oppositely directed gamma rays having energies of 511 keV.

In some embodiments, the PET scanner 8 provides time-of-flight (TOF) event localization capability. For example, some suitable imaging systems with TOF-PET capability include Ingenuity™ and Gemini™ PET/CT systems with TOF capability (available from Koninklijke Philips Electronics NV, Eindhoven, the Netherlands). Note that in these illustrative systems the acronym "CT" denotes "computed tomography", as these imaging systems are dual-modality systems providing both PET and CT modalities.

While the PET scanner 8 (optionally with TOF capability) is illustrated as an example, other nuclear imaging modalities that record events corresponding to nuclear decay events are also suitably used. As another illustrative example, the imaging apparatus may be a gamma camera that acquires single photon emission computed tomography (SPECT) imaging data. Each recorded event comprises a datum that (1) defines some spatial localization of the corresponding nuclear decay event and (2) includes a time stamp.

In the illustrative case of conventional PET, the nuclear decay event comprises a sequence of (i) a nuclide decay emitting a positron which (ii) annihilates in an electron-positron annihilation event that emits two oppositely directed 511 keV gamma rays. Each recorded nuclear decay event is a line of response (LOR) defined by the oppositely directed 511 keV gamma rays along which the nuclear decay event is expected to have occurred (neglecting the typically very short travel distance of the emitted positron before its annihilation). The time stamp for the event is the acquisition time at which the simultaneous 511 keV detections occurred.

In the illustrative case of TOF-PET, the recorded event comprises the LOR with further time-of-flight localization along the LOR, for example represented as a Gaussian or other probability distribution. The time stamp for the event is the acquisition time at which the substantially simultaneous 511 keV detections occurred. (Note that for the purpose of assigning the time stamp, the small finite time difference used in computing the TOF localization is negligible and can be ignored. This is because the small finite time difference is typically of order 1 nanosecond or less, whereas the TOF-PET acquisition time is of order minutes, tens of minutes or longer.)

In the illustrative case of SPECT, the nuclear decay event comprises a radioisotope decay event that emits an alpha particle, beta particle, gamma particle, or so forth. Each recorded event is a projection along a line or small-angle cone defined by a collimator mounted on the SPECT detector head. The radioisotope decay event is thus known to have occurred along the projection (neglecting scattering or the like). The time stamp for the event is the time at which the detection of the emitted particle occurred.

With continuing reference to FIG. 1, the acquired nuclear imaging data are stored in a list mode in a list mode data storage 20. By "list mode" it is meant that each event recordation includes at least (1) information sufficient to define the measured spatial localization of the corresponding nuclear decay event (e.g., the LOR in the case of PET, optionally with further TOF localization, or the projection in the case of SPECT) together with (2) the time stamp for the event. The list mode data are reconstructed by an event-preserving image reconstruction module 22 to generate a reconstructed image dataset that is stored in an event-preserving image dataset storage 24.

The event-preserving image reconstruction module 22 employs an event-preserving image reconstruction algorithm in which the contribution to the reconstructed image of each individual recorded event is identified (i.e., preserved). Most known image reconstruction algorithms are not event-preserving. For example, typical filtered backprojection algorithms, iterative forward/backprojection algorithms, Fourier transform-based reconstruction algorithms, and so forth are usually not event-preserving. In most reconstruction algorithms the output is a spatial map in which each voxel is assigned a grayscale intensity that is statistically indicative of the number of nuclear decay events originating at that voxel.

A readily understood event-preserving reconstruction algorithm is one operating on list mode data in which each recorded event records localization information sufficient to localize the corresponding nuclear decay event to a single point (or small aspect-ratio volume) in space. In this case, each recorded event can be identified as contributing to intensity from a single voxel of the reconstructed image corresponding to the location of the nuclear decay event. The grayscale intensity for a voxel of the reconstructed image is then computed as the total number of nuclear decay events occurring in that voxel. This event-preserving reconstruction algorithm is applicable to TOF-PET data if the scale of the TOF localization is comparable with the voxel size. In practice, with current TOF-PET imaging systems, the TOF localization is too coarse to enable this type of reconstruction to be employed.

More generally, an event-preserving reconstruction algorithm can be viewed as a recorded event classification algorithm that classifies or assigns each recorded event to a most probable voxel—that is, to a voxel that most probably (in a statistical sense) contained the corresponding nuclear decay event. The recorded event is then assigned to the most probable voxel (or, alternatively, may be assigned in a probabilistic sense to one, two, or more voxels, with a membership probability for each voxel). The intensity of a given voxel is then the count of recorded events assigned to that voxel. (In the probabilistic variant, the intensity of a given voxel is the sum of recorded events assigned to that voxel with each recorded event scaled by its membership probability for that voxel.)

An example of a reconstruction algorithm that can be adapted to perform event-preserving reconstruction of high resolution images is Arkadiusz Sitek, "Reconstruction of Emission Tomography Data Using Origin Ensembles", IEEE Transactions on Medical Imaging, published online Dec. 10, 2010 (DOI number 10.1109/TMI.2010.2098036) (hereinafter "Sitek"). This algorithm represents voxel grayscale intensity as a count of the number of recorded events estimated to have originated from that voxel. The estimate is performed using origin ensembles. However, the image output by the Sitek reconstruction algorithm is represented as voxel grayscale values, and hence does not actually provide event preservation.

With reference to FIG. 2, an event-preserving reconstructed image dataset $I_D$ suitably generated by an event-preserving reconstruction algorithm is illustrated. In the example of FIG. 2, the reconstructed event-preserving reconstructed image dataset $I_D$ is represented as a list of the recorded events, with each recorded event further including a voxel assignment generated by the event-preserving reconstruction. The word "Event" as used in FIG. 2 (and also in FIG. 3) denotes the spatial localization information, and each event also includes a time stamp and the voxel assignment. The "Event" and "Time stamp" data of the event-preserving reconstructed image dataset $I_D$ are thus seen to be the same as the corresponding informational content of the original list mode data (stored in the list mode data storage 20), but extended by the addition of voxel assignments as provided by the event-preserving reconstruction algorithm.

In one suitable format, the event-preserving reconstructed image dataset $I_D$ is stored as a list or table of data in which each row corresponds to a recorded event corresponding to a nuclear decay event and the table includes spatial localization (i.e. "Event"), timestamp, and voxel assignment columns. (While this illustrative list or table format is employed herein in the illustrative examples, the dataset $I_D$ may be organized in other formats, such as a transposed arrangement in which the columns correspond to events and the rows correspond to data items, and/or with the various columns or rows variously arranged, or so forth). The illustrative event-preserving reconstructed image dataset $I_D$ (in which events are organized as rows of the list or table) may be sorted on any column. If the data are sorted on the time stamp column, then the original list mode ordering is retained. This is the format shown in FIG. 2.

With reference to FIG. 3, the event-preserving reconstructed image dataset $I_D$ may instead be sorted on the voxel assignment column. Since more than one recorded event may assigned to the same voxel by the reconstruction algorithm, the event-preserving reconstructed image dataset $I_D$ ordered as shown in FIG. 3 suitably includes a group of zero, one, two, three, or more events associated with each voxel, with each event being represented by its spatial localization and time stamp information. Each "voxel group" may, in turn be sorted by time stamp, so as to provide a record in time of when events originated at that voxel. It is readily apparent that the format for storing the event-preserving reconstructed image dataset $I_D$ may be readily transformed by applying suitable sorting or other reformatting. For example, to go from the format of FIG. 2 to the format of FIG. 3, sorting is suitably performed on the voxel assignment column.

In the examples of FIGS. 2 and 3, the event-preserving reconstructed image dataset $I_D$ includes, for each event: (1) the spatial localization information acquired during imaging data acquisition and stored as part of the list mode data; (2) the timestamp; and (3) the voxel assignment. However, it is contemplated to omit data item (1), since it is effectively superseded by the voxel assignment (which is a more specific spatial localization as compared with the LOR, projection, or other spatial localization provided in the acquired list mode data). In such embodiments, the event-preserving reconstructed image dataset comprises, for each event: a timestamp and a voxel assignment.

On the other hand, if data item (1) is retained as part of the event-preserving reconstructed image dataset $I_D$ (as illustrated), then in one variant embodiment the two data storages 20, 24 can be merged, since the event-preserving reconstructed image dataset $I_D$ is a superset of the list mode data (that is, includes all information of the list mode data plus the voxel assignment information).

The event-preserving reconstructed image dataset $I_D$ of FIGS. 2 and 3 assumes that the event-preserving reconstruction algorithm assigns each event to a single voxel. Alternatively, the event-preserving reconstruction algorithm may be designed to assign a single recorded event to (possibly multiple) voxels with a membership probability for each voxel. In this case, the voxel assignment associated with a given recorded event may include multiple voxel assignments, with each voxel assignment including a membership probability. In the data set format of FIG. 3, this means that a single event may be listed under two or more different voxels, with a (generally different) membership probability for each voxel. It will be appreciated that such a "soft" classification of events into voxel assignments with membership probabilities can be readily converted to a "hard" classification of each event into a single voxel assignment by selecting (for each event) that voxel having the highest membership probability.

With the event-preserving reconstructed image dataset $I_D$, it is straightforward and computationally efficient to generate a grayscale image for display. For example, using the format of FIG. 3, the grayscale intensity for any given voxel is proportional to the count of the number of recorded events assigned to that voxel. Rather than direct proportionality, it is also contemplated to employ a non-proportional count-to-grayscale intensity transform, for example to implement a chosen tone reproduction curve for contrast enhancement or the like. The count of events-per-voxel can also be readily computed using the format of FIG. 2, but in that case entails searching through the list of recorded events to identify and count all events assigned to the voxel. In the variant embodiment in which a given recorded event may be assigned to two or more different voxels with membership probabilities, the voxel grayscale value is computed by scaling the contribution of each recorded event to the voxel by its membership probability.

With returning reference to FIG. 1, it is recognized herein that the preservation of individual event identity, including time stamp information, in image space through the mechanism of the disclosed event-preserving reconstruction algorithm and output event-preserving reconstructed image dataset $I_D$ enables new types of post-reconstruction processing. The event-preserving reconstructed image dataset $I_D$ can be "segmented" in the time dimension without re-reconstructing the acquired (e.g., list mode) data. This enables capabilities such as improved motion detection and compensation, display of "interval" images generated from data acquired in selected time intervals, generating cinematic movies, and so forth. Toward this end, in the illustrative embodiment of FIG. 1 a temporal image navigator module 30 is provided to perform various time-related post-reconstruction image processing tasks. The illustrative navigator module 30 includes an interval image display module 32 for displaying an image generated from data acquired over a user-selected contiguous time interval. A cinematic sequence display module 34 repeats this processing for successive time intervals to generate and cinematically display frames of a cinematic sequence (i.e., a cinematic movie). A data editing and selection module 36 enables a radiologist or other user to navigate the event-preserving reconstructed image dataset $I_D$ in time through selective time segmentation in order to identify time intervals of "bad" data that are corrupted by patient motion or other artifact sources. A phase image display module 38 enables the image to be segmented in time in accordance with cardiac cycling, respiratory cycling, or another relevant physiological cycle. In the illustrative example, the phase image display module 38 utilizes electrocardiographic (ECG) data collected during the nuclear imaging data acquisition by an ECG instrument 40 and stored in a data storage 42. As yet another suitable application, a periodic/aperiodic motion compensation module 44 performs motion correction of both periodic and aperiodic motion trajectories, and is capable of correction motion of multiple objects having different motion trajectories in the same image. These various capabilities are described in turn herein.

The computational components 22, 30 of the imaging system of FIG. 1 are suitably embodied by a digital processing device 50 (optionally augmented with analog or hybrid digital/analog circuitry embodied by application-specific integrated circuitry, or ASIC, or other analog or hybrid components). The illustrative digital processing device is as an illustrative computer 50, which includes or has access to a hard disk drive, random access memory (RAM), FLASH memory, optical memory, or other data storage device or component (or combination thereof) suitably embodying the memory components 20, 24, 42. The computer or other digital processing device 50 also may include or have access to a display device 52 via which the various generated images and cinematic sequences are displayed. The computer or other digital processing device 50 also may include or have access to a keyboard or other user input device or devices 54 via which a radiologist or other human user may interact with the system to operate the imaging apparatus 8 and interact with and control the computational components 22, 30. It will also be appreciated that the disclosed image reconstruction and post-reconstruction processing techniques may be embodied by a storage medium (e.g., a magnetic medium such as a hard drive, or an electronic storage medium such as RAM or FLASH memory, or an optical memory, or so forth) storing instructions executable by a digital processing device 50 to perform various methods as disclosed herein.

With continuing reference to FIG. 1 and with further reference to FIG. 4, suitable processing performed by the interval image display module 32 to display an interval image generated from data acquired over a user-selected contiguous time interval is described. In the illustrative approach of FIG. 4, the event-preserving reconstructed image dataset $I_D$ is segmented into successive contiguous time intervals each of width Δt. In an operation 60, the events binned into time interval bins of width Δt. Although in the illustrative example the bins all have equal width Δt, it is also contemplated to employ bins of various widths. (For example, if the time of onset of radiopharmaceutical inflow into a region of interest is known, then the entire time prior to this onset may be placed in a single bin). In an operation 62, an interval image corresponding to each bin is generated and displayed by setting each voxel grayscale value to correspond to the number of events in the time bin that are assigned to that voxel. (In the case of soft voxel assignments the contribution of each event to the voxel is suitably scaled by its membership probability for that voxel.) In an additional or alternative operation 64, the sequence of images are displayed as a cinematic movie, with each interval image forming a frame of the movie and the frame time for displaying each successive interval image being proportional to the Δt of that bin.

With reference to FIG. 5, two illustrative examples of the interval image sequence output by the operation 62 are diagrammatically shown. The lefthand side of FIG. 5 shows the result for bins of time interval Δt, while the righthand side of FIG. 5 shows the result for "wider" bins of time interval 3Δt. The illustrative example includes a feature (shown as a filled black object) that is moving cyclically with a time period of 5Δt. In this case, the lefthand time segmentation having time "resolution" Δt is able to resolve this cyclical motion. In contrast, the righthand time segmentation having time resolution 3Δt is "too coarse" to resolve the cyclical motion, and instead shows a blurry feature due to the substantial motion of the feature over the (longer) time interval.

The processing of FIGS. 4 and 5 reconstructs all the data together in a single reconstruction (while preserving event identity) and then segments the resulting event-preserving reconstructed image dataset $I_D$. This approach has substantial advantages. Because the event-preserving reconstructed image dataset $I_D$ includes all acquired events of the imaging data, the issue of data sparsity during image reconstruction is obviated. By contrast, attempting to perform time segmentation by binning the data before reconstruction can lead to issues of data sparsity: If a bin is too narrow then it may have insufficient data to allow for an accurate reconstruction.

Additionally, the approach of FIGS. 4 and 5 enhances workflow efficiency because different time intervals can be displayed without performing re-reconstruction of the list mode imaging data. In the processing diagrammatically shown in FIG. 4, going from the Δt resolution of the lefthand side of FIG. 5 to the 3Δt resolution of the righthand side of FIG. 5 (or vice versa) entails merely repeating the binning operation 60 for the new bin size and the display generation operation 62, the latter of which amounts to a simple recounting operation.

With reference to FIG. 6, an illustrative display suitably shown on the display device 52 by the computer 50 enables convenient user navigation in the time domain to identify an optimal time segmentation. The user selects the time interval Δt using a slider input 70. Whenever the time interval Δt is adjusted by the user via the slider input 70, the processing operations 60, 62 of FIG. 4 are repeated. A cinematic movie generated by the operation 64 is shown in a window 72, which may optionally loop so that the user can study the motion of any moving features. If the features appear to be blurry, the user can reduce Δt using the slider 70 in order to increase the time resolution of the cinematic movie. On the other hand, if Δt becomes too small then there may be so little data in each bin that the intensity becomes washed out (a likely result if the voxel intensities are not normalized so that the voxel with the highest count has the maximum allowable grayscale value) or loses contrast or becomes noisy (two possible results if the intensities are normalized as the per-frame normalization factor becomes noisy).

Additionally, the illustrative display of FIG. 6 includes an interval image shown in a window 74. The displayed interval image is for the time interval Δt (user-selected via the slider 70) starting at (or centered at, or otherwise referenced to) a time $t_o$ that is entered by the user via an input window 76. The user can thus navigate through time by adjusting the time $t_o$ of the interval image shown in the window 76. Note that to update the interval image the processing of FIG. 3 can optionally be limited to a single bin—that is, the operation 60 can be applied only to identify data for the bin of width Δt at time $t_o$, and the display operation 62 can be applied only for that bin.

The illustrative navigational controls 70, 76 are merely illustrative examples, and can be replaced by other user input formats. For example, $t_o$ may be user-supplied via a slider input analogous to the Δt slider 70. In another alternative, the entire succession of interval images can be shown (as per FIG. 5) in which case the $t_o$ input is not needed. Optionally the user may be able to enlarge window 72 or window 74 to a "full screen" mode by clicking on it or otherwise selecting it for full-screen viewing.

The illustrative display of FIG. 6 further includes a multiphasic time segmentation option that may be selected by the user via a selection box 80 (shown as currently not selected in FIG. 6). As diagrammatically shown in the display, the illustrative multiphasic time segmentation option performs cardiac cycle segmentation in which the data are segmented into a systole phase of time interval $\Delta t_{systole}$ and a diastole phase of time interval $\Delta t_{diastole}$. In this example, $\Delta t_{diastole} > \Delta t_{systole}$ which accounts for the diastolic phase being longer and more quiescent as compared with the systolic phase. While this illustrative example segments into two cardiac phases, segmentation into three, four, or more phases is also contemplated, as well as segmentation based on other physiological cycles such as respiratory cycling.

With reference to FIG. 7, processing performed by the phase image display module 38 (see FIG. 1) to implement the multiphasic time segmentation set forth in the display of FIG. 6 is described. An operation 82 employs the electrocardiograph (ECG) data acquired by the ECG 40 during acquisition of the imaging data to identify time intervals corresponding to each cardiac phase interval of interest (e.g., the systole phase interval $\Delta t_{systole}$ and the diastole phase $\Delta t_{diastole}$ in the example of FIG. 6). Note that the systole phase interval $\Delta t_{systole}$ and the diastole phase interval $\Delta t_{diastole}$ repeat for each cardiac cycle—accordingly, the operation 82 identifies a set of non-contiguous time intervals corresponding to the systole phase, and identifies another set of non-contiguous time intervals corresponding to the diastole phase. In an operation 84, the event-preserving reconstructed image dataset $I_D$ is sorted by cardiac phase. Each event is assigned to the systole phase or the diastole phase based on whether the timestamp for the event falls within a systole phase interval $\Delta t_{systole}$ or a diastole phase interval $\Delta t_{diastole}$, respectively. In an operation 86, an image for each phase (or, alternatively, for a single phase of interest) is displayed by setting each voxel grayscale value to correspond to the count of events sorted into that phase and assigned to that voxel. (Again, in the case of soft voxel assignments the contribution of each event of the phase to the voxel is suitably scaled by its membership probability for that voxel.)

Again, the processing of FIG. 7 has some similarity to retrospective gating techniques. However, in retrospective gating techniques the list mode imaging data are sorted by timestamp into the various phases based on the ECG data (or other physiological cycle record) before reconstruction, and the data sorted into each phase are reconstructed separately. In contrast, in the processing of FIG. 7 the entire list mode dataset is reconstructed together to generate the event-preserving reconstructed image dataset $I_D$, and segmentation into the various phases is performed post-reconstruction as enabled by the event preservation provided by the event-preserving reconstructed image dataset $I_D$. As a consequence, the image reconstruction is not forced to operate on sparse data, but rather operates on a large dataset (i.e., the entire event-preserving reconstructed image dataset $I_D$). Additionally, if the user decides that the phase segmentation is unsatisfactory, he or she can adjust the phase intervals and repeat the phase image generation, without re-reconstructing the data. With brief reference back to FIG. 6, for example, the vertical bars delineating the boundaries of $\Delta t_{systole}$ and $\Delta t_{diastole}$ are optionally user-adjustable to adjust these intervals. Once adjusted, the phase identification, sorting, and display operations 82, 84, 86 are repeated. These are operations are principally sorting and counting operations, and hence can be performed efficiently. In contrast, in gated imaging any change in the phase intervals entails re-reconstructing the data binned into the updated phase intervals.

An advantage of the disclosed event-preserving reconstructed image dataset $I_D$ is that it enables adjustment of time segmentation without re-reconstructing the list mode image data. However, as further disclosed herein the event-preserving reconstructed image dataset $I_D$ can also be useful for tuning a re-reconstruction. This functionality is provided by the data editing and selection module 36.

With reference to FIGS. 8-10, operation of the data editing and selection module 36 is described. FIG. 8 illustrates a suitable output of the interval image display module 32 (whose operation has already been described with reference to FIGS. 4 and 5). The output is a succession of interval images for successive time intervals of width $\Delta t$. It is assumed that the user has already tuned the time interval width $\Delta t$ as already described with reference to FIG. 6. However, in the example of FIG. 8, it is seen that one interval image 90 (the second image from the top in FIG. 8) remains blurry, and in particular the black feature includes a low intensity portion protruding to the lower left. The remaining images do not include this low intensity portion, but the black feature in those images is somewhat distended toward the lower left. A reasonable interpretation of this is that the blurriness of the feature in the interval image 90 is due to some sort of artifact, e.g. motion, an imaging system-induced artifact, or so forth. Moreover, the distention of the feature in the remaining images can be understood because the event-preserving image reconstruction operates on all data, including the data of the time interval of the blurry image 90. As a consequence, there can be some "leakage" of the artifact in the image 90 into the remaining interval images. To address this, the user selects the blurry interval image 90 for removal from the dataset. In the illustrative example, this is done with a dialog "Re-reconstruct without this time interval?" with the selectable options "Yes" or "Cancel". By selecting "Yes", the user invokes the re-reconstruction process shown in FIG. 9 in order to generate updated images shown in FIG. 10.

With particular reference to FIG. 9, the re-reconstruction operates on the list mode data stored in the storage 20. In an operation 100, the events having timestamps in the excluded interval corresponding to the blurry image 90 are removed. The remaining list mode imaging data are reconstructed in an operation 102 by invoking the event-preserving image reconstruction module 22 (see also FIG. 1) to re-reconstruct the list mode data with the excluded data removed. The output of the operation 102 is an updated event-preserving reconstructed image dataset $I_D'$ that is suitably stored in the storage 24. The updated event-preserving reconstructed image dataset $I_D'$ includes the list mode data with the excluded interval removed and with updated voxel assignments generated by the re-reconstruction operation 102.

FIG. 10 shows the interval images generated by applying the interval image display module 32 to the re-reconstructed data. An immediately apparent consequence is that there is no updated equivalent to the blurry image 90 shown in FIG. 8. This is because the data for that time interval has been removed—as a consequence, when the binning operation 60 (see FIG. 4) bins data into the various time intervals, no events are binned into the excluded time interval and hence no image is displayed. Optionally, the missing interval image of FIG. 10 can be filled in by the blurry image 90, if the blurry image is preferable to a completely missing image, or by an image generated by averaging or otherwise combining the two neighboring images in time.

Another consequence of the re-reconstruction is that the distension toward the lower-left of the black feature that is apparent in the images of FIG. 8 is eliminated. This is because the re-reconstruction does not utilize the data of the excluded interval which includes the low intensity artifact shown in the blurry image 90, and hence that artifact cannot "leak" into the other interval images. The result is substantial improvement of the remaining images shown in FIG. 10.

In the processing of FIG. 9, the re-reconstruction 102 employs the event-preserving image reconstruction module 22. However, it is alternatively contemplated for the re-reconstruction to employ a different, and optionally non-event preserving, reconstruction module (or algorithm), such as filtered backprojection (FBP). This might be appropriate if the alternative reconstruction algorithm has benefits not realized by the event-preserving reconstruction algorithm. In such a case, the event-preserving image reconstruction module 22 is first applied to generate the event-preserving reconstructed image dataset $I_D$. The data editing and selection module 36 is then applied to variously segment the image in time so as to identify "bad" time intervals of data acquisition. These "bad" time intervals are then removed, and the remaining "good" data are reconstructed by FBP or another reconstruction algorithm of choice.

With reference to FIG. 11, operation of the periodic/aperiodic motion compensation module 44 is described. The event-preserving reconstructed image dataset $I_D$ enables the selection of events in image space that contribute to individual structures of interest. This allows motion correction to be effectively applied in the presence of an inhomogeneous motion vector field in which different structures of interest move in individual and generally different motion patterns against a non-uniform background or in the vicinity of hot static backgrounds. Note that the term "structure of interest" as used herein is intended to broadly encompass any structure of interest that is discernable in the image, such as (but not limited to) anatomical structures (e.g. organs), artificial structures (e.g. implants), metabolic structures (e.g., concentrations of radiopharmaceutical generated by metabolic activity), differentiated tissue structures (e.g., tumors, necrotic tissue, et cetera), and so forth.

Starting with the list mode data stored in the data storage 20, the event-preserving image reconstruction module 22 is applied in an operation 110 to produce an event-preserving reconstructed image. This image may be blurred due to motion of one or more structures. In an operation 112 the event-preserving reconstructed image is segmented to identify one or more structures of interest. The segmentation operation 112 may employ manual segmentation (e.g., displaying image slices on the display device 52 and having the user contour structures manually using a mouse pointer or the like), or an automatic segmentation algorithm, or semi-automatic segmentation (e.g., initial automatic segmentation followed by manual refinement of the contours). In general, the structures can reside on an inhomogeneous background, and/or can be located in the vicinity of high background activity (e.g., liver against a lung nodule). Moreover, each structure can exhibit individual and generally different motion over the course of the data acquisition.

The segmentation operation 112 delineates the region occupied by each structure of interest. Said another way, the segmentation operation 112 identifies a set of voxels corresponding to each structure of interest. Viewed in this latter way, an operation 114 readily constructs an events group corresponding to each structure of interest. The event group for a structure comprises those events assigned by the event-preserving reconstruction to the set of voxels corresponding to the structure. If the reconstruction employs "soft" assignment, then the events of the events group are suitably weighted by their membership probabilities respective to the set of voxels.

In an operation 116, a motion profile is determined for each structure of interest as a function of time. The motion profile characterizes the motion of the structure, for example by indicating the actual motion (i.e., a trajectory) or by indicating the magnitude of motion as indicated by a motion sensor attached to the subject or by a correlated sensor output such as an ECG output. The motion profile can, in general, indicate periodic or aperiodic motion, or could indicate that the structure remains stationary throughout the scan. In general, a separate and independent motion profile is determined for each structure of interest. The operation 116 can employ various approaches for determining the motion profile.

In one approach a motion profile comprising a motion trajectory is determined as follows. The events group for a structure are binned into small (and hence relatively high resolution) time intervals. The events of each time bin are transformed to image space using the voxel assignments of the event-preserving reconstructed image dataset $I_D$. A center of mass is determined for the structure in each time bin, and the resulting centers of mass as a function of time are fitted to a parametric curve or otherwise converted into a motion trajectory. It is noted that the transformed image of each time bin is likely to be noisy since the small time intervals correspond to a relatively small number of events in each time bin—however, the noisy data is sufficient to estimate the motion trajectory. In some embodiments the motion trajectory is not assumed a priori to be a smooth trajectory, since aperiodic abrupt motion events may be present (e.g., caused by abrupt voluntary or involuntary motion of the imaging subject).

In some embodiments it is contemplated for the operation 116 to determine the motion profile based on information other than the imaging data, such as ECG data. Moreover, the motion profile is not necessarily a motion trajectory, but can instead be another metric characterizing the motion as a function of time. For example, an ECG can be used to identify cardiac phases (which indirectly indicate cardiac motion without providing an actual trajectory), or a motion sensor attached to the subject can detect occurrences of abrupt motion without detecting the direction of movement.

The resulting motion profile is used in an operation 118 to perform optimal temporal binning of the events group of each moving structure of interest. In general, the optimization of the time bins for a given structure is respective to the optimization objective of grouping together events that were acquired for a given position of the structure of interest. The motion profile is used to optimally define larger bins for "quiescent" time intervals during which the structure undergoes little or no motion, and smaller bins for dynamic time intervals during which the structure undergoes substantial motion. If the motion profile indicates cyclic motion, then the temporal binning operation 118 can optionally employ a gating approach with cyclic time bins, i.e. non-contiguous time bins corresponding to different phases of the cyclic motion. If the motion profile indicates a slow drift, then relatively large and equally spaced time bins can be employed. If the motion profile indicates aperiodic abrupt motions (as may be the case for voluntary or involuntary movement by a patient) then the times of occurrences of these abrupt motion events suitably serve as time boundaries for the time bins. The optimal time bins generated by the operation 118 are generally different for each structure of interest, as they are optimized for the generally different motion trajectories of the different structures.

In an operation 120, a time bin image is generated for each optimized time bin of each structure. In a suitable approach, events of each (now optimized) time bin are transformed to image space using the voxel assignments of the event-preserving reconstructed image dataset $I_D$. Alternatively, it is contemplated to apply the event-preserving image reconstruction module 22 to perform a re-reconstruction of each structure/optimized time bin group. (Employing a re-reconstruction may be beneficial for an optimized time bin having a large number of events, such as time bin corresponding to long quiescent periods that are separated by abrupt structure motion events).

The output of the operation 120 is a set of time bin images for each structure defined in the operation 112. This information can be used in various ways. In the illustrative approach, a motion compensated image is synthesized from the time bin images in an operation 122 as follows. For each moving structure of interest, the structure in the time bin images is spatially registered to generate a motion corrected structure image. In one suitable registration approach, for each moving structure of interest a geometric transform is determined and applied which matches the structure to a spatial template. For example, one suitable spatial template comprises the initial image generated by the operation 110 and its segmentation by the operation 112. Alternatively, another suitable spatial template comprises the set of time bin images generated by the operation 120 for the first time bins of the structures. The geometric transform is constructed to spatially shift the time bin images of the various time bins to the location of the structure at a reference time (e.g., the start of the scan if the first time bin images are used as the template). A suitable geometric transform for a time bin centered at time t is the shift $x-x_o$ where x is the position of the structure (in 3D) at time t and $x_o$ is the position of the structure (in 3D) at the reference time $t_o$. The shift x as a function of time can be determined from the motion trajectory if operation 120 computes the motion profile as a trajectory. Alternatively, if the operation 120 computes a motion profile that is not a trajectory, then the shift x can be estimated from time bin images themselves, for example by determining the center of mass of the structure in each time bin image and then shifting each time bin image such that the center of mass coincides with the reference position $x_o$ in the time shifted images. In addition to a translational shift, the geometric transform can additionally or alternatively include other geometric transform components such as a rotational transform component, scaling transform component (e.g., to account for changes in the size and/or shape of the object over time) or so forth.

The time-shifted images (with the structure shifted to its position at the reference time $t_o$) are then suitably combined (e.g., by computing the voxel count for a given voxel as the sum of the voxel counts for that voxel in the constituent time shifted images) to form motion-compensated structure images for the structures. The count statistics for each motion-compensated structure image includes all counts contributing to the structure over the entire acquisition time. Blurring is substantially reduced by using motion compensation for each structure that is optimized for the motion of that structure. These motion-compensated structure images are then superimposed on a background provided by the initial image generated by the operation 110 to form the final motion-compensated image.

Additionally or alternatively, the output of the operation 120 comprising a set of time bin images for each structure can be used in other ways. For example, the set of set of images as a function of time can be displayed as a CINE sequence, in which each "frame" comprises the image for one optimized time bin and is displayed for a duration equal to (or proportional to) the duration of that optimized time bin. In the case of a structure undergoing cyclic motion, the frames for the cycle phases can be repeated to show the motion cycling for that structure against the background of (possibly non-cyclic) motion of other structures. If a composite CINE sequence for multiple independently moving structures is to be shown, this can be accomplished by generating frames for frame time intervals wherein the content of each frame consists of the time bin images for time bins coinciding with the frame time interval. The result is a CINE sequence the shows the independent and generally different movements of different structures.

It is also contemplated to extend the disclosed motion compensation to a structure undergoing two or more different and independent motions, for example undergoing both cyclic and non-cyclic motion. For example, consider cardiac imaging during which the heart undergoes cardiac cycling and also undergoes one or more abrupt translational motions due to patient movement. One way to deal with these two independent motion components is to apply the approach of FIG. 11 directly, with the small time bins used for the motion profile determination operation 116 being small enough to resolve both the cyclic and non-cyclic motion components. However, this unmodified approach does not take advantage of retrospective phase gating to combine data from different repetitions of the same cardiac phase cycle. This is because repetitions of a given cardiac phase across abrupt motion boundaries are no longer truly periodic, since there is an additional translational shift.

A modified approach that does enable retrospective phase gating is to modify the operation 116 to separately identify the abrupt motion profile and cyclic motion profile components. Then the temporal bin optimization operation 118 is repeated twice once to bin respective to the non-cyclic motion, and a second time to bin respective to the cardiac cycling within each non-cyclic motion bin. The first temporal bin optimization respective to non-cyclic (abrupt) motion events produces a few large time bins. For example, if the subject caused three abrupt motion events by three voluntary motion incidents, then the bin optimization respective to abrupt motion will generate four time bins. Then, each of these time bins is subdivided into smaller time bins that are optimized respective to the cyclic motion component. Since the events within each time bin generated by the first (non-cyclic) optimization are quiescent respective to abrupt patient motion, successive intervals of the same cardiac phase within the time bin can be combined to implement retrospective cardiac gating within the time bin. This combines all data for a given cardiac phase within each abrupt motion time bin. Operation 120 is applied for each phase bin within each non-cyclic time bin to generate a set of phase images within each non-cyclic time bin. Finally, the operation 122 is modified to combine all events to generate a single cardiac image that is compensated for both cardiac cycling and non-cyclic abrupt patient motions by generating and applying two geometric transforms: one that compensates only for the abrupt motion component, and one that compensates only for the cardiac cycling motion component. On the other hand, structures other than the heart are processed by the approach of FIG. 11 without modification so as to compensate for the non-cyclic abrupt patient motion (which affects all structures in the subject) without concomitant compensation for cardiac cycling.

This application has described one or more preferred embodiments. Modifications and alterations may occur to others upon reading and understanding the preceding detailed description. It is intended that the application be construed as including all such modifications and alterations insofar as they come within the scope of the appended claims or the equivalents thereof.

Having thus described the preferred embodiments, the invention is now claimed to be:

1. A non-transitory storage medium storing instructions executable by a digital processor to perform a method comprising:

providing imaging data comprising events wherein each event records at least spatial localization information for a decay event and a timestamp for the decay event;

reconstructing the imaging data using a digital processing device implementing an event-preserving reconstruction algorithm to generate an event-preserving reconstructed image dataset comprising the events of the provided imaging data with for each event the timestamp and at least one spatial voxel assignment that assigns the event to a single voxel or to one or more voxels with a membership probability for each voxel; and performing a post-reconstruction image processing operation on the image, the post-reconstruction image processing operation utilizing timestamps of the event-preserving reconstructed image dataset.

2. The non-transitory storage medium of claim 1, wherein the performing of post-reconstruction image processing comprises:
identifying a plurality of structures of interest in the event-preserving reconstructed image dataset;
performing independent motion compensation for each identified structure of interest to generate motion-compensated image data; and
displaying the motion-compensated image data in a visually perceptible format.

3. The non-transitory storage medium of claim 2, wherein the performing of independent motion compensation for each identified structure of interest to generate motion-compensated image data comprises performing motion compensation that compensates non-cyclic motion of at least one identified structure.

4. The non-transitory storage medium of claim 2, wherein the performing of independent motion compensation for each identified structure of interest to generate motion-compensated image data comprises performing motion compensation that compensates abrupt motion of at least one identified structure.

5. The non-transitory storage medium of claim 2, wherein the performing of independent motion compensation for each identified structure of interest to generate motion-compensated image data comprises performing motion compensation that compensates different motion trajectories of different identified structures.

6. The non-transitory storage medium of claim 1, wherein the performing comprises:
identifying a structure of interest in the event-preserving reconstructed image dataset;
identifying an events group corresponding to the structure wherein the events group comprises events assigned to spatial voxels of the structure by the event-preserving reconstructed image dataset;
identifying a motion profile for the structure;
optimizing time bins for time binning events of the events group based on the motion profile for the structure; and
generating a time bin image for each optimized time bin.

7. The non-transitory storage medium of claim 6, wherein the generating of the time bin images does not include performing image reconstruction on the time bins.

8. The non-transitory storage medium of claim 6, wherein the performing further comprises:
combining the time bin images of the structure to generate a motion-compensated structure image by spatially shifting the time bin images to a reference time; and
displaying an image comprising at least the motion-compensated structure image.

9. The non-transitory storage medium of claim 6, wherein the performing further comprises:
spatially registering the structure in the time bin images to generate a motion corrected structure image.

10. The non-transitory storage medium of claim 6, wherein the performing further comprises:
displaying a CINE sequence including at least the time bin images.

11. The non-transitory storage medium of claim 6, wherein the identifying of the motion profile comprises identifying a non-cyclic motion trajectory for the structure.

12. The non-transitory storage medium of claim 6, wherein the identifying of the motion profile comprises identifying the motion profile of the structure as comprising at least one abrupt motion event.

13. A method comprising:
acquiring imaging data comprising events using a positron emission tomography (PET) or single photon emission computed tomography (SPECT) scanner wherein each event records at least spatial localization information for a decay event and a timestamp for the decay event;
reconstructing the imaging data to generate an image by using a digital processing device to perform an event-preserving image reconstruction algorithm to generate an event-preserving reconstructed image dataset comprising for each event the timestamp and at least one spatial voxel assignment; and
storing the image comprising the event-preserving reconstructed image dataset in an image dataset storage.

14. The method of claim 13, further comprising:
after the reconstructing, generating a derived image comprising at least a portion of the data related to the events of the event-preserving reconstructed image dataset, the portion of the data being selected based at least on timestamps of the events, the derived image being generated without performing an image reconstruction algorithm on the portion of the data; and
displaying the derived image.

15. The method of claim 14, wherein the generating of the derived image comprises:
assigning a grayscale intensity for each voxel of the derived image based on a count of the number of events of the sub-set assigned to that voxel.

16. A method comprising:
providing imaging data comprising events wherein each event records at least spatial localization information for a decay event and a timestamp for the decay event;
reconstructing the imaging data using an event-preserving image reconstruction algorithm to generate an event-preserving image in which the timestamps of the events are preserved; and
generating a derived image from the event-preserving image by removing the contribution to the event-preserving image of a portion of the imaging data wherein said portion is selected based on the preserved timestamps, the derived image being generated from the event-preserving image without performing an image reconstruction algorithm;
wherein the reconstructing and the generating are performed by a digital processing device.

17. The method of claim 16, further comprising:
displaying the derived image.

18. A method comprising:
providing imaging data comprising events wherein each event records at least spatial localization information for a decay event and a timestamp and at least one spatial voxel assignment for the decay event;
reconstructing the imaging data using an event-preserving image reconstruction algorithm to generate an event-preserving image in which the timestamps and the at least one spatial voxel assignment of the events are preserved;
sorting the events of the event-preserving image into time bins based on the preserved timestamps;
generating a time bin image for each time bin; and
displaying at least one of (i) one or more of the time bin images and (ii) a CINE sequence of the time bin images;
wherein the reconstructing, sorting, and generating are performed by a digital processing device.

19. The method of claim 18, wherein the generating of the time bin images does not include performing an image reconstruction algorithm.

20. The method of claim 18, further comprising:
receiving a user selection of a time interval for the time bins, the generating and displaying being performed for time bins of the user-selected time interval, the generating and displaying being updated when an updated user-selected time interval is received.

21. The method of claim 20, wherein the receiving is performed using a slider input by which a user selects the time interval.

22. The non-transitory storage medium of claim 1, wherein the imaging data are selected from a group consisting of (1) line-of-response (LOR) data acquired by positron emission tomography (PET), (2) LOR data with time-of-flight (TOF) localization acquired by TOF-PET, and (3) projection data acquired by single photon emission computed tomography (SPECT).

23. The method of claim 16, wherein the providing comprises:
acquiring the imaging data from a subject including an administered radiopharmaceutical wherein the imaging data comprises events wherein each event records at least spatial localization information for a nuclear decay event and a timestamp for the nuclear decay event.

24. The method of claim 16 wherein the generating comprises:
generating the derived image comprising an interval image for a selected time interval by removing the contribution to the event-preserving image of said portion of the imaging data wherein said portion of the imaging data lies outside of the selected time interval based on the preserved timestamps.

25. The method of claim 16 wherein the generating comprises:
generating the derived image comprising a phase image for a selected cardiac cycling phase by removing the contribution to the event-preserving image of said portion of the imaging data wherein said portion of the imaging data lies outside of the selected cardiac cycling phase based on the preserved timestamps and electrocardiographic (ECG) data collected during acquisition of the imaging data.

26. The method of claim 16 wherein the generating comprises:
generating the derived image comprising a phase image for a selected respiratory cycling phase by removing the contribution to the event-preserving image of said portion of the imaging data wherein said portion of the imaging data lies outside of the selected respiratory cycling phase based on the preserved timestamps and respiratory data collected during acquisition of the imaging data.

* * * * *